(12) United States Patent
Lynch et al.

(10) Patent No.: US 6,314,127 B1
(45) Date of Patent: Nov. 6, 2001

(54) SYSTEM AND METHOD FOR ENHANCING SIGNAL RECEPTION

(75) Inventors: Michael A. Lynch, Landing; Anthony A. Triolo, Succasunna, both of NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/255,786

(22) Filed: Feb. 23, 1999

(51) Int. Cl.[7] ................................................ H04K 1/10
(52) U.S. Cl. ........................ 375/144; 375/148; 375/267; 375/347; 375/349; 455/137
(58) Field of Search .................................... 375/142, 144, 375/148, 150, 267, 343, 347, 349; 455/137, 139, 273, 276.1

(56) References Cited

U.S. PATENT DOCUMENTS

| | | | |
|---|---|---|---|
| 4,027,247 | * 5/1977 | Aranguren | 325/305 |
| 4,320,535 | * 3/1982 | Brady et al. | 455/278 |
| 4,752,969 | * 6/1988 | Rilling | 455/278 |
| 5,581,583 | * 12/1996 | Conti et al. | 375/347 |
| 5,652,765 | 7/1997 | Adachi et al. | 375/211 |
| 5,926,503 | * 7/1999 | Kelton et al. | 375/206 |
| 6,052,405 | * 4/2000 | Nakano | 375/200 |
| 6,115,426 | * 9/2000 | Fujimoto et al. | 375/260 |

* cited by examiner

*Primary Examiner*—Stephen Chin
*Assistant Examiner*—Dac V. Ha

(57) ABSTRACT

A system for enhancing signal reception comprises delay devices coupled to a combiner. The delay devices are adapted to delay respective input signals by corresponding offset delay durations to produce time-staggered delayed signals with respect to one another. The combiner is coupled to the delay devices for combining the delayed signals to form a combined signal. A recorder receives the combined signal for recording the combined signal in the time-domain. The recorder records the combined signal in successive measurement cycles. Each successive measurement cycle contains a time window corresponding to each of the delayed signals. An evaluator evaluates the recorded signal for determining average power, within each time window, over a group of the successive measurement cycles for each of the delayed signals to prepare for determining cross-correlation between pairs of the delayed signals.

39 Claims, 7 Drawing Sheets

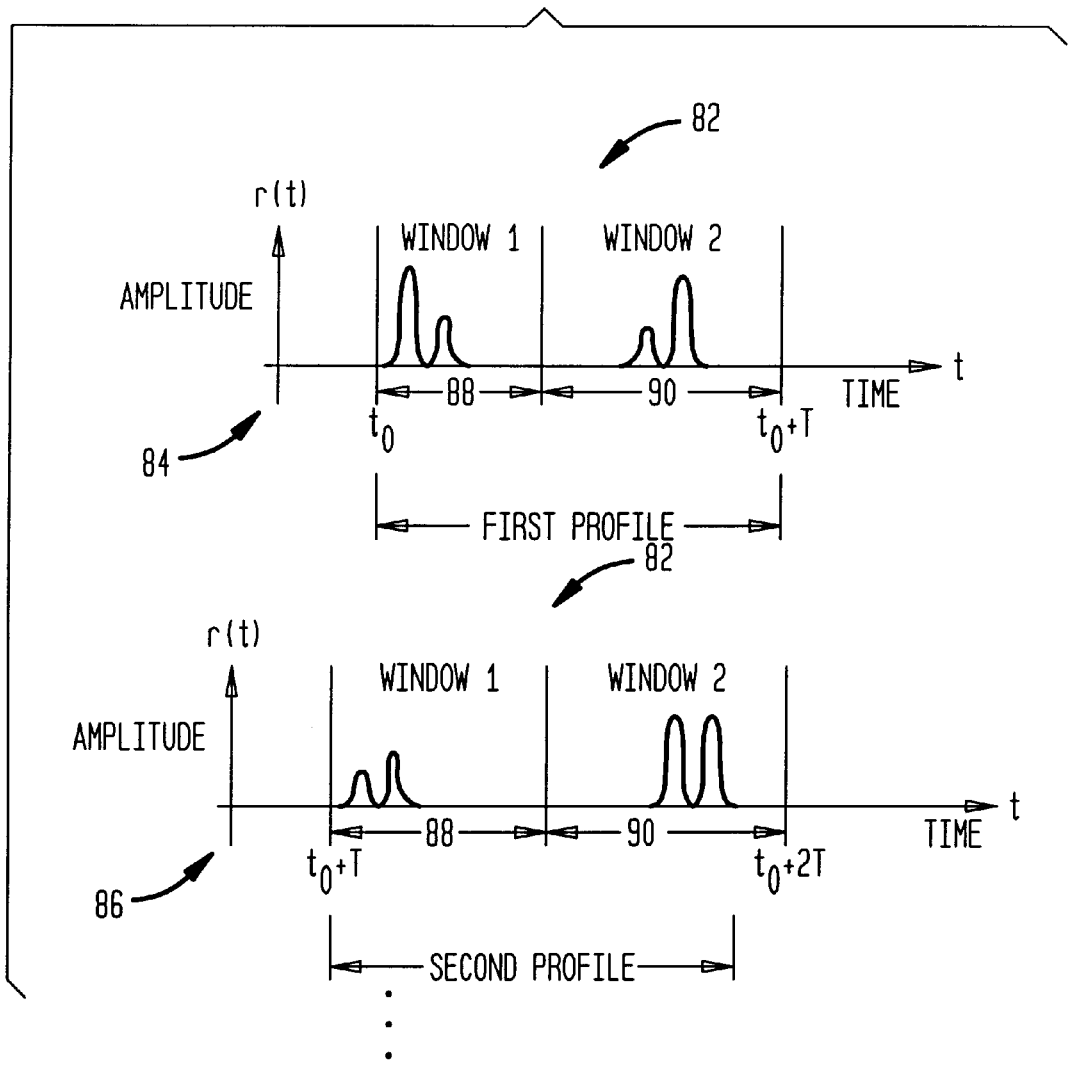

SYSTEM AND METHOD FOR ENHANCING SIGNAL RECEPTION

FIELD OF THE INVENTION

The invention relates to a system and method for enhancing signal reception.

BACKGROUND OF THE INVENTION

Current practices for measuring signal parameters of a received electromagnetic signal involve using multiple synchronized receivers. Signal parameters include relative amplitude and correlation between received signals. A received signal may be distributed among multiple signal branches of a measuring system. A signal branch refers to a path for the distribution of one or more received electromagnetic signals. The path of the signal branch may include a transmission media (e.g., coaxial cable) or may be integrated into a circuit board (e.g., microstrip). For each signal branch, a separate receiver typically is required to measure the signal parameters associated with a corresponding signal branch. The requirement for multiple receivers tends to increase the size, weight, and cost of the conventional measuring system.

To obtain accurate correlation measurements between signal branches, all receivers are synchronized using a highly stable external oscillator (e.g., stability better than 10 parts per million of the oscillator frequency). All receivers are calibrated for amplitude variations from unit to unit to reduce errors in the relative amplitude measurements. However, the synchronization and amplitude calibrations are time-consuming and subject to human error. Moreover, each receiver may experience relative amplitude drift due to differences in temperature from receiver to receiver. Thus, a need exists for an improved measuring system which eliminates or expedites the calibration process, including its temporal and amplitudinal aspects.

The reception of received electromagnetic signals may sometimes be improved through the use of diversity antennas. Yet, the full benefit of diversity gain is often lost because the receiving system lacks the necessary sophistication to accurately decide whether or not to combine signals from different diversity branches of the diversity antenna. Thus, a need exists for a measuring system that may be incorporated into a receiving system to enhance reception of received electromagnetic signals through an accurate analysis of signal parameters.

SUMMARY OF THE INVENTION

In accordance with the invention, a system for enhancing signal reception comprises delay devices coupled to a combiner. The delay devices are adapted to delay respective input signals by corresponding offset delay durations to produce time-staggered delayed signals with respect to one another. The combiner is coupled to the delay devices for combining the delayed signals to form a combined signal. A recorder receives the combined signal and records the combined signal in the time-domain. The recorder records the combined signal in successive measurement cycles. Each successive measurement cycle contains a time window corresponding to each of the delayed signals. An evaluator evaluates the recorded signal for determining average power, within each time window, over a group of the successive measurement cycles for each of the delayed signals. The evaluation of the evaluator prepares for determining cross-correlation between pairs of the delayed signals.

In one aspect of the invention, only one time-domain recorder, as opposed to multiple receivers, is required to receive and record input signals from multiple signal branches. Measuring signal parameters is expedited because only one recorder needs to be calibrated regardless of the number of signal branches. The measuring method of the invention is not affected by thermal drift caused by temperature variations among receivers associated with each branch, because only one recorder is required. The reduction in the number of receivers required offers the opportunity to reduce power consumption and cost of the measuring system, while improving the accuracy of measurements of signal parameters.

In another aspect of the invention, a measuring system may be incorporated into a receiving system to enhance the reception of transmitted electromagnetic signals. The reception of transmitted electromagnetic signals is enhanced by improving the accuracy of measurements involving correlation and relative power among multiple signal branches. The receiving system is capable of selecting the best combination of the signal branches as a received signal based upon a mathematical function of the measured correlation and the measured relative power. Therefore, if diversity antennas are used, improvements ranging from approximately 3 dB to 6 dB or more in received signal strength are possible, along with potential reduction of deep fades of the received signal.

BRIEF DESCRIPTION OF THE DRAWINGS

FIG. 8 shows a first measurement cycle with two time windows and a second measurement cycle with two time windows in accordance with the invention.

FIG. 9 illustrates a hypothetical chart of average power for each delayed signal in a corresponding signal branch over multiple measurement cycles.

DETAILED DESCRIPTION OF THE PREFERRED EMBODIMENTS

Figure 1:
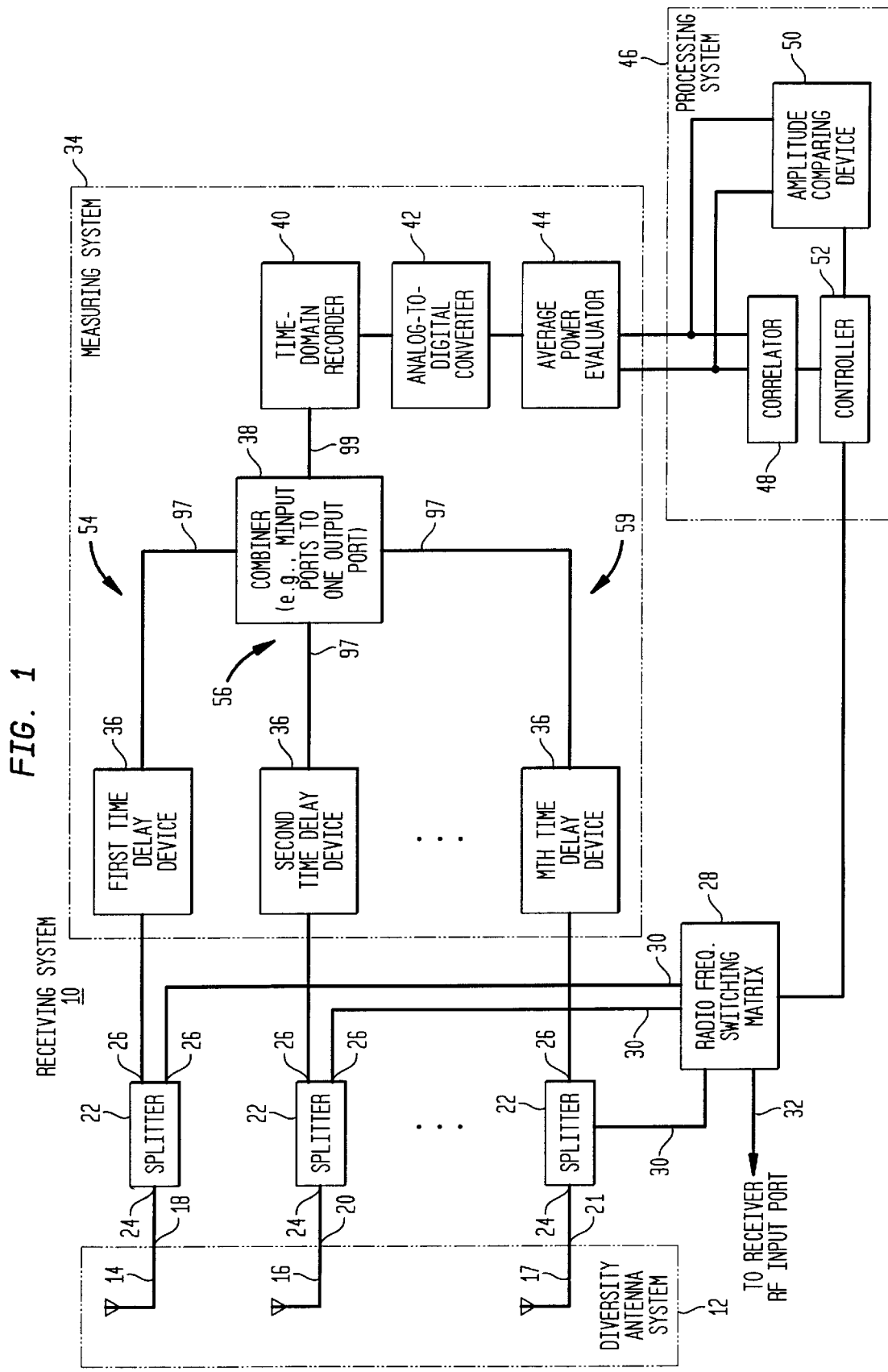
FIG. 1 is a block diagram of a receiving system including a measurement system in accordance with the invention.

FIG. 1 shows a block diagram of a receiving system 10 including a diversity antenna system 12 coupled to a measuring system 34 via splitters 22, a radio frequency switching matrix 28 coupled to the splitters 22, and a processing system 46 coupled to the measuring system 34 and the radio frequency switching matrix 28.

Antenna System

The diversity antenna system 12 generally comprises any antenna system capable of realizing any diversity gain through a diversity technique, including space-diversity, dual-polarization, polarization diversity, angular diversity, frequency diversity, or any combination of the foregoing techniques. Space-diversity antenna systems include antennas that are spaced apart from one other to an appropriate extent to yield diversity gain during the reception of an electromagnetic signal. Angular diversity antenna systems include antennas that have a peak gain of a main lobe directed in the same general direction, except with an angular azimuth offset, an angular elevation offset, or both with respect to one other.

Polarization-diversity antennas include, for example, a dual-polarization antenna in which a first antenna has a first polarization and a second antenna has a second polarization different from the first polarization. Different potential polarizations include linear polarization (e.g., horizontal polarization, vertical polarization, +45 degrees, and −45 degrees), elliptical polarization, and circular polarization. To maximize enhancement of received signals, two linear antenna elements may be orthogonally arranged with respect to each other. A common polarization diversity scheme is a dual-polarization antenna system including a horizontally polarized antenna element and a vertically polarized antenna element integrated into a single antenna.

Frequency-diversity antenna systems include antennas with a frequency offset with respect to one another. The antennas in a frequency diversity arrangement may comprise narrow-band antennas tuned specific portions of a frequency band in which their gain is the highest. In a preferred embodiment in accordance with the invention, spatially-diverse, dual-polarization antennas may be used to provide at least four diversity signal inputs to the receiving system.

In FIG. 1, the diversity antenna system 12 comprises a first antenna 14, a second antenna 16, and at least one other antenna, up to an mth antenna 17, tuned to an identical frequency band and arranged to yield diversity gain during the reception of an electromagnetic signal. The diversity antenna system 12 preferably has a first antenna port 18 associated with a first antenna 14; a second antenna port 20 associated with a second antenna 16; and at least one other antenna port up to an mth antenna port 21 associated with the mth antenna 17. In a preferred embodiment, the diversity antenna system 12 provides separate input signals at the first antenna port 18, the second antenna port 20, and the mth antenna port 21 for application to the measuring system 34. Radio frequency amplifiers (not shown) are introduced as necessary to amplify the received signal from the antenna system 12 as is known to those of ordinary skill in the art.

The first antenna port 18, the second antenna port 20 and at least one other antenna port up to the mth antenna port 21 are connected to radio frequency splitters 22. Each splitter 22 distributes the received signal as a plurality of diversity input signals from the diversity antenna system 12. The diversity input signals are preferably unequally distributed between the measuring system 34 and the radio frequency switching matrix 28. Each splitter 22 has one input port 24 and at least two output ports 26. The received signal preferably is applied to the input port 24 and distributed to the output ports 26 such that the majority of the signal strength is distributed to the radio frequency switching matrix 28. In practice, the splitter 22 may comprise a radio frequency transformer, a hybrid splitter 22, or another suitable signal distribution device.

A measuring system 34 comprises time-delay devices 36 coupled to a combiner 38, a time-domain recorder 40 coupled to the combiner 38, and an evaluator 44 coupled to the time domain recorder 40 potentially via an analog-to-digital converter 42.

Time-Delay Devices

The time-delay devices 36 comprise analog or digital time delay devices. For example, analog time delay devices include phase shifters and cascaded phase shifters. Digital time-delay devices 36 include a high-speed digital signal processor having a suitable frequency of operation. In a preferred embodiment, the time-delay device comprises a down-converter for converting the received signal into a lower frequency (e.g.,baseband or intermediate frequency); an analog-to-digital converter for converting the analog signal at the lower frequency into a digital signal; a memory (e.g.,first-in, first out shift register) for delaying the digital signal; and a digital-to-analog converter for converting the digital output of the analog signal into an analog signal for the time-domain recorder 40. Although only three time-delay devices 36 are shown in FIG. 1, in practice any number of time-delay devices 36 may be used so that the number of time-delay devices 36 matches, or at least corresponds to, the number of diversity input signals.

The time-delay devices 36 are adapted to delay respective input signals by corresponding offset delay durations to produce time-staggered delayed signals with respect to one another. If, for example, the received electromagnetic signal is represented by a pulse, a series of pulses, a burst, a series of bursts, or another temporally discrete waveform, each time-staggered delayed signal may be temporally isolated from all other time-staggered delayed signals by various offset durations to permit ready measurement of the time-staggered delay signals. Each input signal is ordinarily delayed by a fixed amount different from the other signal branches. The time delay-devices 36 synchronize the input signals of each signal branch such that the input signals may be combined to produce a combined signal without losing the measurable characteristics of the individual input signals in the signal branches.

Without the operation of the time-delay devices 36, the input signals in the signal branches would temporally overlap if they were combined in the combiner 38, making subsequent measurements of each signal branch at the combiner output 99 difficult or impossible. The signals in each signal branch may have a relative phase delay with respect to other signal branches that depends upon the antenna system 12 and the electrical transmission length between the antenna system 12 and the measuring system 34. The time-delay devices 36 may compensate for the relative phase delays among the signal branches if a relative phase delay has a sufficient magnitude with respect to any offset delay duration to the detract from the measurable characteristics of the input signals.

The time-delay devices 36 are generally adjusted such that each of the offset delay durations is commensurate with an average estimated spreading interval associated with the received signals. However, one of the time-delay devices 36 may be set to zero so long as the input signals are time-staggered with respect to one another. A spreading interval represents the temporal expansion of a transmitted electromagnetic signal (or a segment thereof) as the signal propagates through a dispersive environment such that a received electromagnetic signal (or a segment thereof) originating from the transmitted electromagnetic signal has a longer duration than the transmitted electromagnetic signal.

In an alternate embodiment, if one of the time delay devices is entirely omitted to achieve a time delay of zero, incidental phase delay still would be introduced by a transmission medium or electrical path from the splitter 22 to the combiner 38.

Combiner

The combiner 38 is coupled to the time-delay devices 36 for combining the delayed signals to form a combined signal 82. The number of input ports of the combiner 38 generally corresponds to the number of time-delay devices 36. The combiner 38 preferably has one output port, although in an alternate embodiment multiple output ports are provided for redundancy of the time-domain recorder 40 and any other components of the measuring system 34 to enhance reliability of the measuring system 34.

Recorder

The recorder 40 receives the combined signal 82 and records the combined signal 82 in the time-domain. The time-domain represents signals in terms of amplitude versus time, as opposed to amplitude versus frequency. The recorder 40 preferably comprises a radio frequency receiver with the capability to store and hold a plurality of measurement cycles in an analog or digital format. If the recorder 40 stores the measurement cycles in an analog format, the analog-to-digital converter 42 may be required to interface the average power evaluator 44. A combination of the recorder 40 and the analog-to-digital converter 42 may comprise a spectrum-analyzer, a digital oscilloscope, or another radio frequency test device with a digital communications port for communicating with the processing system 46 according to a suitable protocol.

The recorder 40 records the combined signal 82 (FIG. 8) in successive measurement cycles. The recorder 40 records combined signal 82 in terms of amplitude versus time for a sufficient number of time-samples or in an analog manner. Each successive measurement cycle contains a time window corresponding to each of the delayed signals. Each time-window represents a amplitude versus time profile of an input signal in a signal branch over a discrete period of time. A measurement cycle preferably contains a time-window for each signal branch such that each time-window provides signal information that is temporally separated; hence, distinguishable from other time-windows and other measurement cycles.

Evaluator

An evaluator 44 evaluates the recorded signal for determining average power over a group of the successive measurement cycles for each of the delayed signals. The evaluator 44 samples related time windows from the group of successive measurement cycles to obtain an average power for each signal branch among a first signal branch 54, a second signal branch 56, up to an mth signal branch 59. The related time windows represent time windows originating from a particular signal branch. The evaluator 44 may comprise a digital signal processor for determining the average power for signal branches over one or more measurement cycles. The evaluator 44 determines the average power, within each time window, to prepare for the processing system's determination of an average power ratio and a cross-correlation between any two signal branches. The arithmetic average power within a time window may be regarded as an instantaneous power measurement if the time window represents a suitably short duration. Any correlation determined herein, may be determined with reference to an arithmetic average power over a time window or with reference to an instantaneous power.

In an alternate embodiment, the evaluator 44 may comprise a combination of a data processor, memory, and appropriate instructions for determining the average power over one or more measurement cycles.

Processing System

In the illustrative embodiment of FIG. 1, a processing system 46 includes a correlator 48 and an amplitude comparing device 50 coupled to the evaluator 44. A controller 52 is coupled to the correlator 48 and the amplitude comparing device 50. The correlator 48 generally determines correlation between each possible pair of signal branches over one or more measurement cycles. The correlator 48 preferably determines the correlation between the average power of a pair of the delayed signals over a group of the measurement cycles. The amplitude comparing device 50 generally determines relative amplitude between each possible pair of signal branches over one or more measurement cycles. The amplitude comparing device 50 preferably determines a relative amplitude ratio between the average power of any pair of the delayed signals over the group of the measurement cycles. In practice, the correlator 48, the amplitude comparing device 50, and the controller 52 may be embodied as a general purpose computer programmed with appropriate instructions to accomplish the aforementioned functions.

The processing system 46 is adapted to determine a correlation between at least one pair of the delayed signals. In addition, the processing system 46 is adapted to determine a relative amplitude between at least one pair of the delayed signals. The processing system 46 includes a controller 52 for generating a control signal having states indicating whether or not to synchronously combine the diversity input signals in the switching matrix 28 based upon the determined correlation and the determined relative amplitude. The diversity input signals originate from a received signal incident upon the antennas (14,16,17) and distributed among multiple diversity antenna ports, including the first antenna port 18, the second antenna port 20, and at least one other antenna port up to the mth antenna port 21.

Figure 2:
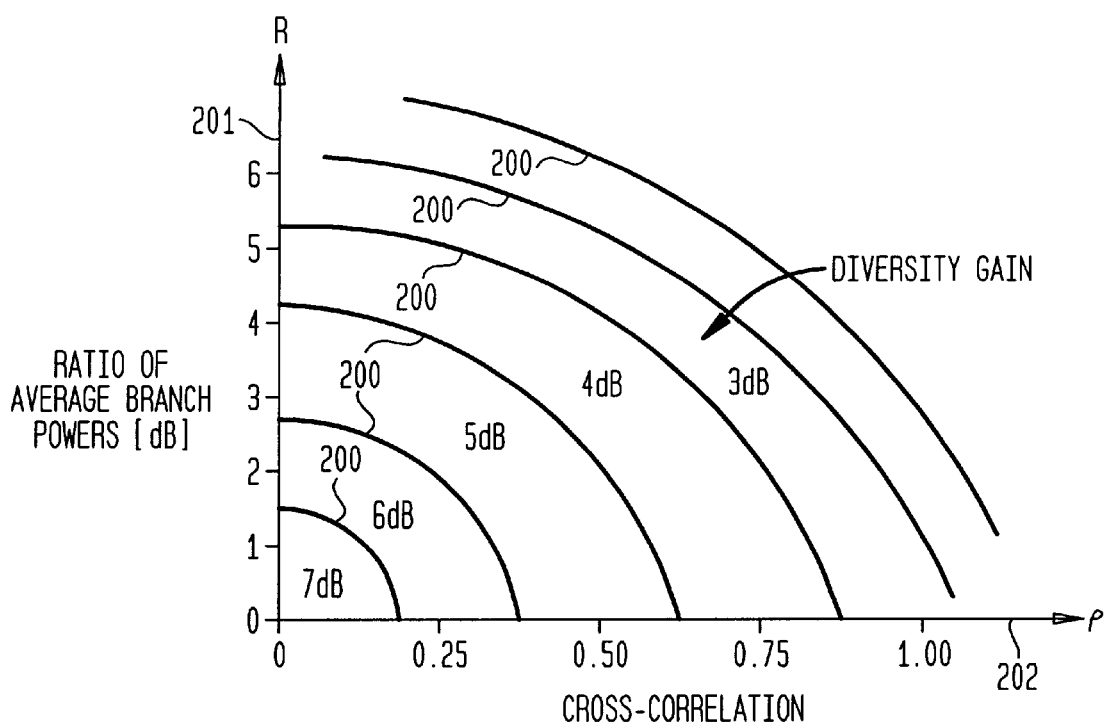
FIG. 2 is a graph showing diversity gain contours as a function of cross-correlation and power ratio for any two diversity signal branches.

The controller 52 may have different program instructions to optimize the reception of received signals. FIG. 2 illustrates a preference for combining at least a pair of signal branches having an average power ratio and a corresponding cross-correlation that falls within the highest possible diversity gain contour. Diversity gain may be defined as the difference between an average power within a single signal branch, without any combining, and the average power resulting from the combination of at least two signal branches. Accordingly, the controller 52 may attempt to identify a relative amplitude ratio between any pair of diversity signals approaching one or approximately equaling one and a corresponding correlation for the pair approaching or equaling approximately zero so as to achieve the highest possible diversity gain, as best illustrated in FIG. 2.

In another embodiment, the controller 52 generates a control signal to combine input signals corresponding to a pair of the delayed signals if the relative amplitude ratio is equal to one or differs from one by no greater than a maximum tolerance and if the cross-correlation approaches one or zero within a predetermined tolerance to minimize the magnitudinal extent of fading of the received signal.

Because greater than two signal branches with associated time delays are present in the measuring system, the processing system 46 preferably determines a correlation matrix 96 (FIG. 11) containing respective cross-correlations between corresponding pairs of the delayed signals for each possible pair of the diversity signal branches. Further, the processing system preferably determines a relative amplitude matrix 102 (FIG. 11) containing amplitude ratios between corresponding pairs of the delayed signals for each possible pair of the diversity signal branches. The processing system 46 then includes a controller 52 for generating a control signal having states indicating whether or not to synchronously combine the input signals based upon the correlation matrix 96 and the relative amplitude matrix 102.

Switching Matrix

A radio frequency switching matrix 28 has radio frequency inputs 30, a radio frequency output 32 capable of being interconnected with one or more of the radio frequency inputs 30, and a control terminal 11 for communication with the controller 52. The controller 52 controls the interconnection of the radio frequency inputs 30 and the output 32 to improve signal reception based on the measured correlation, the measured relative amplitude, or both. If a correlation matrix 96 and a relative power matrix 102 are measured, the processing system 46 periodically identifies the best pair of signal branches for combining over one or more measurement cycles. For each value, $\rho_{mn}$, in the correlation matrix 96 (FIG. 11) and $r_{mn}$ in the relative amplitude matrix 102 (FIG. 11), wherein m and n represent signal branch identifiers, the diversity gain of a received signal may be modeled as a mathematical function of $r_{mn}$ and $\rho_{mn}$.

FIG. 2 is a graph showing a combination of diversity signals associated with two different signal branches among the first signal branch 54, the second signal branch 56, and at least one other signal branch up to the mth signal branch 59. The vertical axis 201 represents an average power ratio between any pair of diversity signals, while the horizontal axis 202 represents a cross-correlation between the same pair of the diversity signals. The arcuate contours 200 represent contours of equal diversity gain for the particular combination of the average power ratio and the cross-correlation. The diversity gain may be realized if the two different signal branches are coherently or synchronously combined.

Figure 3:
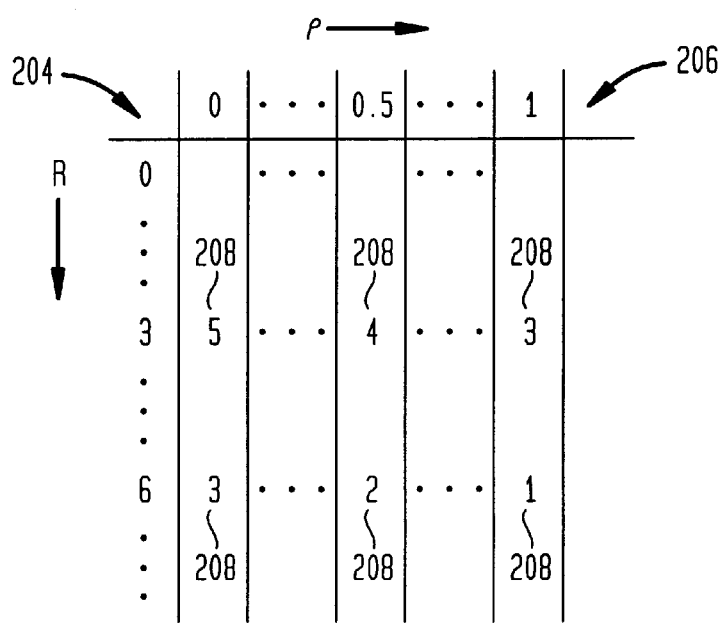
FIG. 3 illustrates the graph of FIG. 2 as a look-up table for deciding which diversity signal branches to combine.

FIG. 3 shows the graph of FIG. 2 in the form of a look-up table. As illustrated, the look-up table has the average power ratio in the left-most column 204 and the cross-correlation values in the upper-most row 206. Diversity gain 208 in decibels is provided in the other entries in the table, so that each combination of average power ratio and cross-correlation has a corresponding, but not necessarily unique, diversity gain 208. Although FIG. 3 illustrates one possible example of a look-up table, any other suitable data structure, such as a relational database may be used to store the diversity gain information versus cross-correlation and average power ratios.

Once the processing system 46 determines the cross-correlation and average power ratio between any pair of m signal branches, the processing system 46 preferably estimates the diversity gain 208 achieved by combining the pair of the signal branches by accessing the look-up table or a comparable database. The processing system 46 preferably estimates a diversity gain achieved by combining each possible pair of signal branches until a highest diversity gain in the received signal is associated with an identified pair of signal branches. However, in an alternate embodiment, the processing system estimates a diversity gain until a predetermined target threshold diversity gain (e.g., 6 dB or greater) is realized to conserve processing resources and expedite selection of the best combination of signal branches to achieve reception enhancement of the received signal.

Operation of the Measuring System

The measuring system 34 operates in the following manner. An electromagnetic signal is transmitted for reception at the measuring system 34. The electromagnetic signal is received at the measuring system 34 via the antenna system 12. If the electromagnetic signal is assumed to be a pulse with a transmitted pulse duration, the received duration of the pulse may be greater than the transmitted pulse duration because of time-dispersive propagational effects.

Each antenna (14,16,17) is coupled to a corresponding signal branch for receiving a transmitted electromagnetic signal. The antennas (14,16,17) simultaneously receive the transmitted electromagnetic signal except for any phase differences caused by the spatial separation between the antennas. Each signal branch has a delay element set to a different time delay interval such that the signal from each signal branch (54,56,59) may be analyzed separately from other signal branches. Each delay unit provides a time delay interval greater than the received pulse duration with due consideration of time dispersive propagational effects. In particular, the signal branch delay preferably is greater than the time dispersive delay by a tolerance which acts as buffer time in case significant variations or deviations occur from the average dispersive delay.

After each signal branch (54,56,59) passes the received signal through a known fixed time delay interval, all delayed signals are then combined for input into the time-domain recorder 40. The time-domain recorder 40 may demodulate the signal prior to recording. Each signal branch (54, 56, 59) is limited to a time window equal to or greater than the delay of the received pulse duration plus the tolerance time. The single time-domain recorder 40 (e.g., a scalar channel sounder or oscilloscope) preferably determines the correlation and relative amplitude between all possible pairs of the signal branches (54, 56, 59). No need exists for cross-unit calibrations of receivers because only the single time-domain recorder 40 is used. Moreover, the accuracy of relative amplitude measurements is increased since all the measurements are taken on the same time-domain recorder 40.

After or during recording, the cross-correlation between any two branches and relative amplitude between any two branches can be determined by analyzing time windows. The average power within each time window is compared as time progresses by using analysis software.

Application of the Measuring System for Signal Enhancement

The following application of the measuring system focuses on combining two out of m diversity branches for signal enhancement, although greater than two signal branches (e.g., n total branches) may be combined to improve reception. If two signal branches out of m signal branches are considered, where the two signal branches have a first signal and a second signal, signal enhancement may be realized by combining the first signal and the second signal in accordance with the following considerations:

First, if a correlation between a first signal and a second signal is the lowest correlation between any two signal branches during a group of measurement cycles, and if the relative amplitudes of the first signal and the second signal during the group of the measurement cycles are equal or different within a predetermined range, the first signals and second signals may be combined to increase gain by approximately 6 dB or more. Theoretically, the greatest gain occurs if the first and second signals have a correlation equal to or approaching zero (i.e. an uncorrelated condition) and if the first and second signals have roughly equivalent average amplitudes. Moreover, under the above circumstances of low correlation between the two signal branches, deep fading, such as Raleigh fading, of the received electromagnetic signal may be reduced, further improving reception.

Second, if the correlation between a first signal and a second signal is higher than a threshold correlation value over a group of measurement cycles, and if the relative amplitude of the first signal and the second signal during the group of measurement cycles are equal or different within a predetermined range, the first and second signals may be combined to increase the gain by as much as 3 dB. Theoretically, a correlation between the first and second signals approaching or equaling one provides a gain of 3 dB if the first and second signals have roughly equivalent average amplitudes.

Third, if the correlation between the first signal and the second signal approaches zero over a group of measurement cycles and the amplitudes are different by a predetermined threshold over the group of measurement cycles, then the first signal and the second signal could be combined, but minimal or no signal enhancement is expected.

Diversity gain may be defined as the difference between an average power within a single signal branch, without any combining, and the average power resulting from the combination of at least two signal branches. For example, the combined average power could be measured at an output port 99 of the combiner 38, while the average power of the signal branch could be measured at an input port 97 of the combiner 38. Diversity combining reduces the outage rate of an electromagnetic signal. The outage rate is the percentage of time a signal stays below a specified threshold, which is usually an electromagnetic noise floor.

Although, the decision to combine the first and second signals, or any n signals out of m available signals, is preferably made by periodically considering a group of measurement cycles, in an alternate embodiment, the decision to combine the first and second signals may be made by considering as little as one measurement cycle. Signal amplitudes of different signal branches falling within a predetermined range from each other are critical to deciding whether or not to combine signals, regardless of whether such signals are correlated or not. Thus, in an alternate embodiment, relative amplitude comparisons between signal branches may be used alone to make the decision on whether or not to combine the first and second signals.

Method for Measuring Signal Parameters

Figure 4:
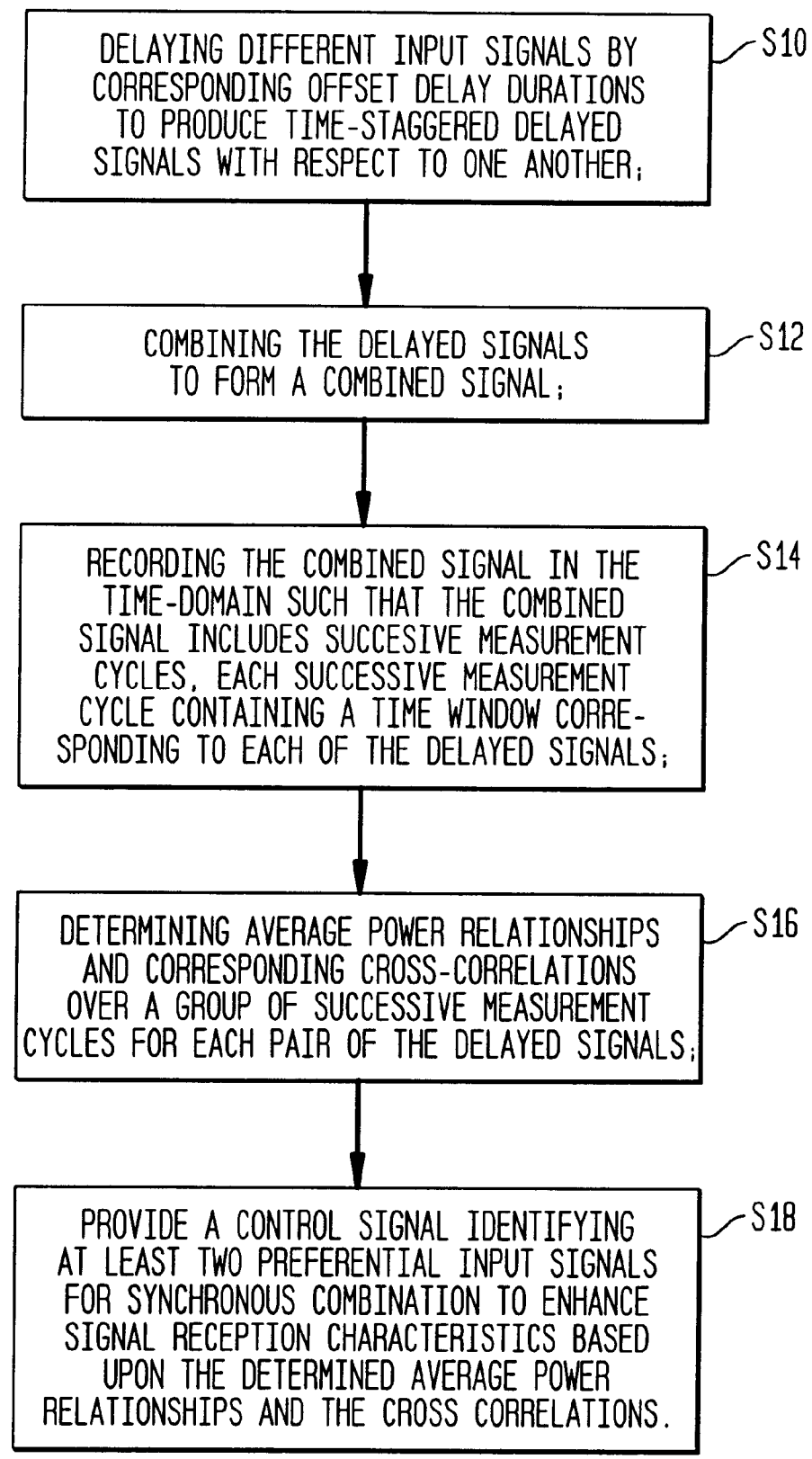
FIG. 4 is a flow chart of a method of measuring signal parameters in accordance with the invention.

In accordance with the invention, a method for measuring signal parameters is shown in FIG. 4. The method begins in step S10. In step S10, time-delay devices 36 delay different input signals by corresponding offset delay durations to produce time-staggered delayed signals with respect to one another.

In general, the delaying step of S10 includes adjusting each of the offset delay durations to be commensurate with an estimated spreading interval of an electromagnetically transmitted signal as a source of the input signals. In a preferred method, the delaying step of S10 may comprise adjusting each of the offset durations to be equal to an estimated spreading interval of an electromagnetically transmitted signal, as a source of the input signals, plus a tolerance interval. Therefore, the offset delay duration may exceed a difference between a first arrival time of a direct pulse 74 (FIG. 7) received as one of the input signals and a second arrival time of an indirect pulse 76 (FIG. 7) being a derivative of the direct pulse 74 and subjected to a propagational delay. Adjusting the offset delay duration to exceed the difference by the tolerance interval assures that no overlap occurs between adjacent time windows from different signal branches of the measuring system 34.

Although the input signals may be provided by any sources, the input signals are preferably provided by a diversity antenna system, such as a space-diversity antenna system or a dual polarization antenna system. A diversity antenna system may include any number of antennas or antenna elements corresponding to the number of diversity signal branches.

In step S12, the combiner 38 combines the delayed signals delayed in step S10 to form a combined signal 82 (FIG. 8). In step S14, the recorder 40 records the combined signal 82 in the time-domain such that the combined signal 82 includes successive measurement cycles. Each successive measurement cycle contains a time window corresponding to each of the delayed signals. In step S16, the measuring system 34 determines average power relationships and corresponding cross-correlations over a group of successive measurement cycles for each of the delayed signals.

In step S18, a processing system 46 preferably provides a control signal identifying at least two preferential input signals for synchronous combination by the switching matrix 28 to enhance signal reception characteristics based upon the determined average powers and corresponding cross-correlation coefficients. To decide which diversity input signals to combine in the switching matrix, in step S18 the processing system 46 determines a correlation between at least one pair of the delayed signals and determines a relative amplitude between at least one pair of the delayed signals.

The processing system 46 periodically determines the correlation relationship between the average power of a pair of the delayed signals over the group of the measurement cycles. The processing system 46 periodically determines a relative amplitude ratio between the average power of a pair of the delayed signals over the group of the measurement cycles.

Correlation relationships, relative amplitudes, or both may be measured on-the-fly through digital signal processing techniques. Alternately, the measured signal parameter values between corresponding pairs of signal branches may be stored in a database for subsequent calculation or evaluation.

The processing system 46 generates a control signal having states indicating: (1) whether or not to synchronously combine the input signals based upon their correlation and their relative amplitude, or (2) which input signals to combine based upon their correlation and their relative amplitude. In accordance with one example, the processing system 46 generates a control signal to combine input signals corresponding to a selected pair of delayed signals if the relative amplitude ratio of the selected pair is equal to one or differs from one by a maximum tolerance and if the correlation of the selected pair approaches one or zero within a predetermined tolerance. The switching matrix 28 interconnects one or more radio frequency inputs 30 with a radio frequency output 32 corresponding to the selected pair in response to a control signal communicated from the controller 52.

If the measuring method is applied to measuring greater than two signal branches, step S18 preferably involves computing a correlation (covariance) matrix and a relative amplitude matrix. The processing system 46 determines a correlation matrix 96 (FIG. 11) containing respective correlations between corresponding pairs of the delayed signals for each possible pair and for determining a relative amplitude matrix 102 (FIG. 11) containing amplitude ratios between corresponding pairs of the delayed signals for each possible pair. The processing system 46 preferably generates a control signal having states indicating whether or not to synchronously combine a best candidate pair of the input signals based upon the correlation matrix 96 and the relative amplitude matrix 102. The best candidate pair of the input signals is combined if their combination would result in the greatest reduction in fading of the received signal, the greatest increase in signal strength, or both out of all correlation and relative amplitude values in the matrices for one or more given measurement cycles.

Method for Enhancing Signal Reception

Figure 5:
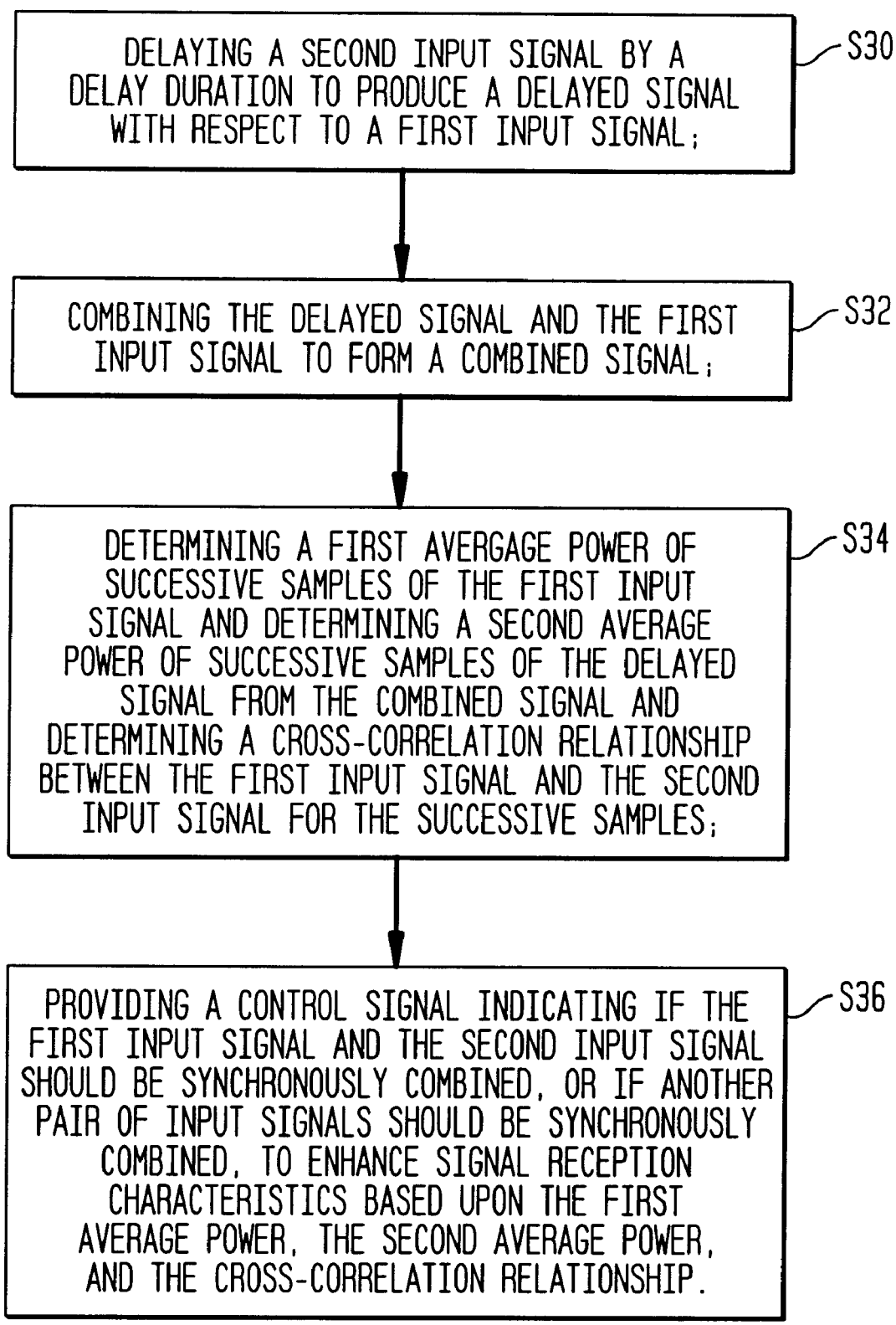
FIG. 5 is a flow chart of a method of enhancing radio frequency reception in accordance with the invention.

In accordance with the invention, a method for enhancing signal reception is shown in FIG. 5. FIG. 5 represents an illustrative application of the measuring method of FIG. 4. The method starts in step S30 in which a delay device delays a second input signal by a delay duration to produce a delayed signal with respect to a first input signal. A first input signal and a second input signal are preferably induced in antennas that are separated to form a diversity antenna system 12. For example, the first input signal and the second input signal may represent a first polarization signal and a second polarization signal, respectively, from a dual-polarization antenna. The first polarization may be vertically polarized and the second polarization may be horizontally polarized.

In step S32, the combiner 38 combines the delayed signal and the first input signal to form a combined signal 82 (FIG. 8). In step S34, the measuring system 34 determines a first average power of successive samples of the first input signal and determines a second average power of successive samples of the delayed signal to form the combined signal 82. The measuring system 34 determines a cross-correlation relationship between the first input signal and the second input signal for the successive samples.

In step S36, a processing system 46 provides a control signal indicating whether or not the first input signal and the second input signal should be synchronously combined to enhance signal reception characteristics based upon the first average power, the second average power, and the cross-correlation relationship between the first input signal and the second input signal.

Further, in step S36, the processing system 46 preferably compares the first average power and the second average power to determine if the first average power and the second average power are equal or differ within a predetermined limit. Accordingly, the controller 52 determines a state of the control signal based upon the average power comparison and the correlation relationship. If the synchronous combination of the first input signal and the second input signal would result in reduced fading magnitudes of the received signal or increased signal strength due to the diversity gain, the first and second signal switching matrix are synchronously combined.

In a first example of reception enhancement following step S36, a switching matrix coherently combines the first signal and the second signal to form a received signal in response to the control signal indicating that the first average power and the second average power are equal or within a predetermined limit from one another.

In a second example of reception enhancement following step S36, a switching matrix coherently combines the first signal and the second signal to form a received signal in response to the control signal indicating the first average power and the second average power are equal or within the predetermined limit and the control signal indicating the relative correlation between the first and second signal is generally uncorrelated.

In a third example of reception enhancement following step S36, a switching matrix coherently combines the first signal and the second signal to form a received signal in response to the control signal indicating the first average power and the second average power are equal or within the predetermined limit and the control signal indicating the relative correlation between the first and second signal is generally correlated.

In a fourth example of reception enhancement following step S36, the switching matrix synchronously combines the first signal and the second signal to form a received signal in response to the control signal indicating that a mathematical function of the first average power, the second average power, and the relative correlation between the first and second signals has been satisfied.

Figure 6:
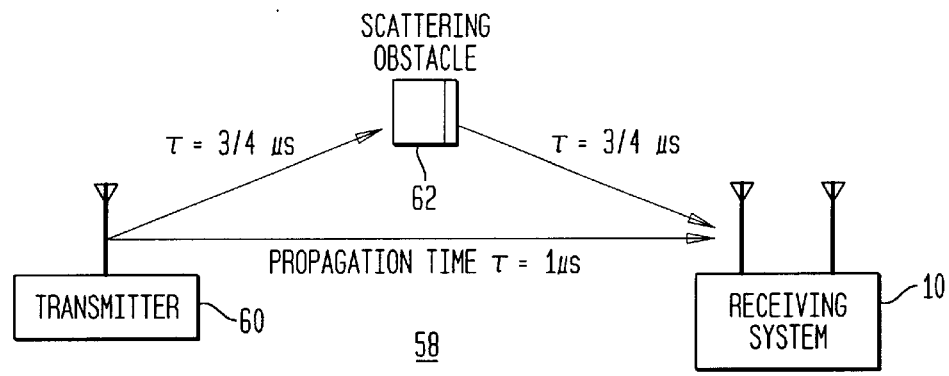
FIG. 6 is diagram illustrating a communications system incorporating a receiving system in accordance with the invention.

FIG. 6 shows a communication system including a receiving system 10 of FIG. 1. The communications system 58 includes a transmitter 60 that transmits an electromagnetic signal to a receiving system 10. Although the transmitter 60 transmits a single signal to the receiving system 10, the receiving system 10 may receive two or more electromagnetic received signals because of a reflective obstacle or scattering obstacle 62 in the path of propagation between the transmitter 60 and the receiving system 10.

Figure 7:
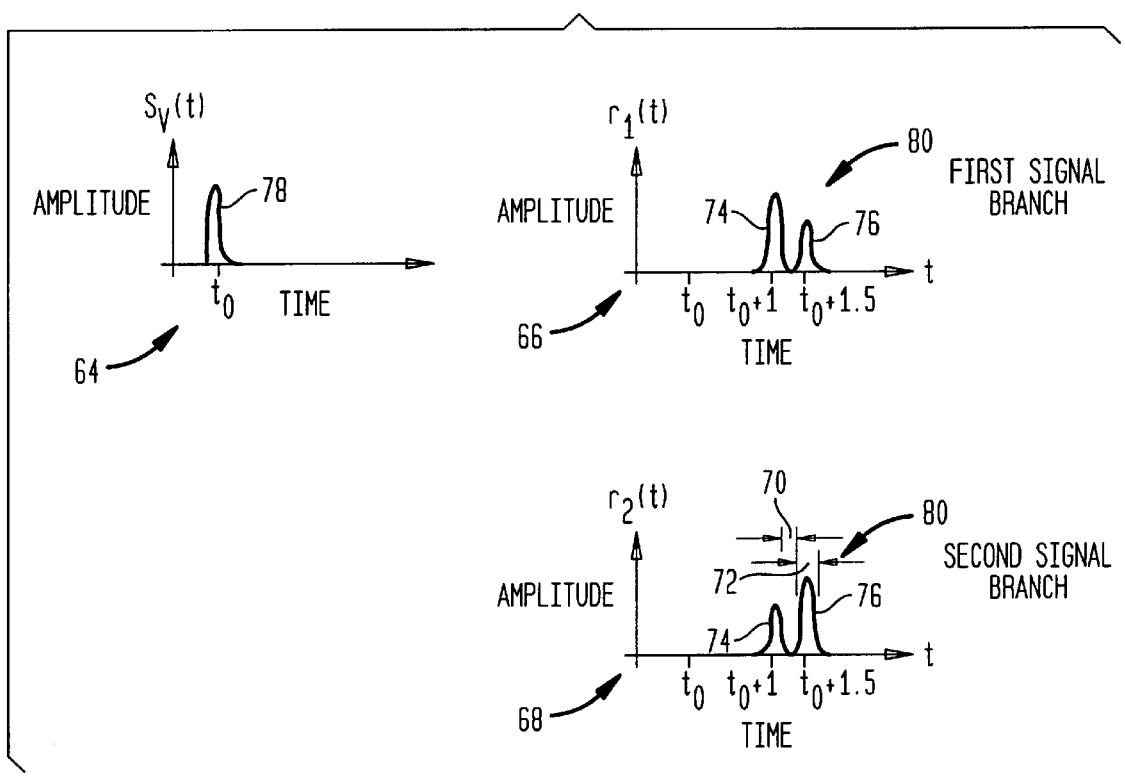
FIG. 7 shows transmit and corresponding receive signal profiles in terms of amplitude versus time.

As best illustrated in FIG. 7, a transmitter 60 transmits an electromagnetic signal, which is the predecessor of the input signals received at the receiving system 10. A transmitted signal profile 64 may be modeled as a transmit pulse 78 for the sake of simplicity. The transmit pulse 78 is shown in terms of amplitude versus time. For each transmit pulse 78 transmitted, the receiving system 10 may receive two or more receive pulses 80 because of propagational scattering or reflections in the intermediate path between the transmitter 60 and the receiving system 10. A first received profile 66 represents a received signal from a first antenna 14 of the diversity antenna, whereas a second received profile 68 represents a received signal from a second antenna 16. The second antenna 16 may be separated from the first antenna 14 as in a space-diversity arrangement.

A spreading interval includes a temporal difference 70 between a first arrival time of a direct pulse 74 received at the measuring system 34 and a second arrival time of an indirect pulse 76 being a derivative of the direct pulse 74 and subjected to a propagational delay prior to being received at the measuring system 34. The spreading interval equals the foregoing temporal difference 70 plus a duration 72 of the indirect pulse 76. The spreading interval is preferably used to estimate an appropriate time delay for the delay devices as previously described.

In practice, multiple pulses, similar to pulse 78, may be successively transmitted during a transmission such that the direct pulse 74 and the indirect pulse 76 iteratively follow each other for the duration of the transmission. Further, the system and the method of the invention described herein apply to virtually any type of transmitted signal, regardless of whether it is modeled as one or more pulses.

FIG. 8 represents the combined signal 82 as recorded by the time-domain recorder 40 in step S14 of FIG. 4. A first measurement cycle 84 and a second measurement cycle 86 are graphically shown in terms of time versus amplitude, with time on the horizontal axis and amplitude on the vertical axis. A first measurement cycle 84 illustratively contains a first time window 88 and a second time window 90. The first measurement cycle 84 ranges in time from $t_o$ to $t_o$ +T. The first time window 88 represents a first delayed signal of a first signal branch 54. The second time window 90 represents a second delayed signal of a second signal branch 56. The second measurement cycle 86 illustratively ranges in time from $t_o$+T to $t_o$ +2T. The second measurement cycle 86 contains a first time window 88 and a second time window 90 representing a first delayed signal, and a second delayed signal, respectively, at a later time than the first measurement cycle 84. Each time window is preferably a time bin or time slot of equal width determined based upon the signal spreading interval, as previously described. Although only two time windows per measurement cycle are shown, it is understood that the measuring system 34 preferably has a number m of time windows per measurement cycle that are equal to the number of signal branches or input signals. Similarly, although only two measurement cycles are shown, in practice measurement cycles are continuously or periodically completed to update the memory or storage medium of the recorder 40.

FIG. 9 illustrates an output chart illustrative of the operation of the average power evaluator 44. The average power evaluator 44 evaluates the measurement cycles and preferably calculates an average power for each time window (88,90). The column $P_1$ indicates the average signal powers of corresponding time windows for a first delayed signal on a first signal branch 54. The column $P_2$ indicates the average signal powers of corresponding time windows for a second delayed signal on a second signal branch 56. The column $P_m$ indicates the average signal powers of corresponding time windows for an mth delayed signal on a mth signal branch. The column labeled t, indicates the relative elapsed time in terms of the applicable measurement cycle. The first measurement cycle 84 is shown as to; the second measurement cycle 86 is shown as to+T; the third measurement cycle is shown as to+2T. The chart is updated to include additional measurement cycles after or while measurements are completed.

Figure 10:
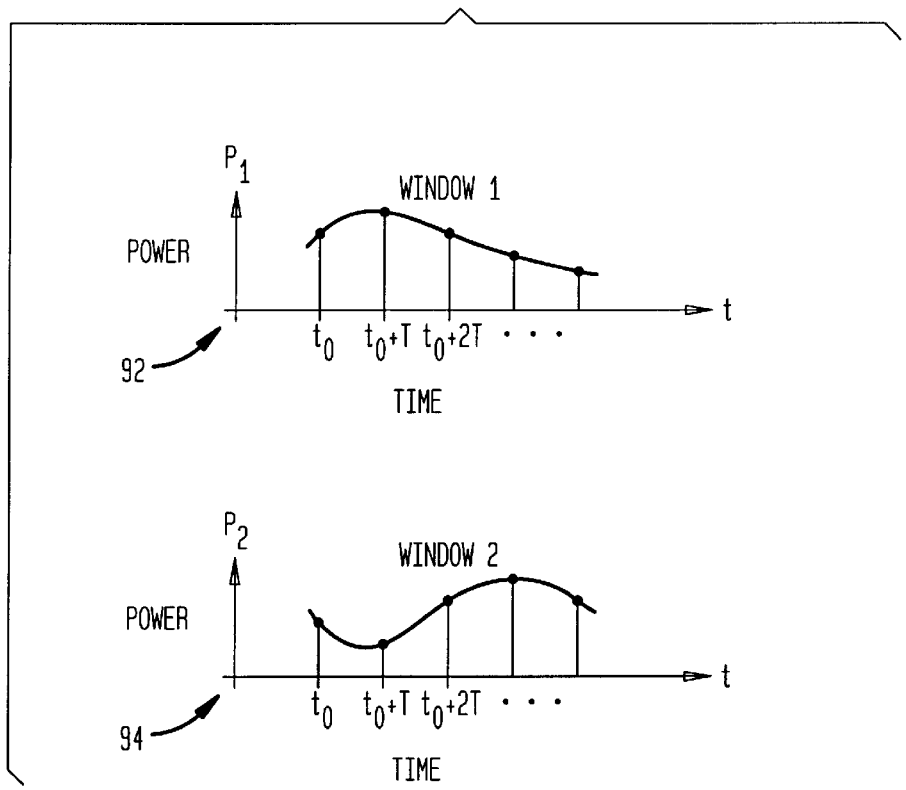
FIG. 10 illustrates a hypothetical graph showing average power versus time for each delayed signal in a corresponding branch over multiple measurement cycles.

FIG. 10 expresses the chart of FIG. 9 in graphical form which may be more convenient for expressing the average power versus time. Although one point per measurement cycle is plotted in FIG. 10, multiple points may be plotted within each time window to better define the average power of each signal branch as it varies with time. The vertical axis of the upper graph 92 represents average power ($P_1$) of a first signal associated with a first signal branch 54, while the horizontal axis represents time. The vertical axis of the lower graph 94 represents an average power ($P_2$) of a second signal associated with a second signal branch 56, while the horizontal axis represents time. A dedicated separate port between the evaluator 44 and the processing system 46 may be provided for each virtual signal branch in the evaluator 44 to facilitate comparison of the virtual signal branches in the processing system 46. The virtual signal branches correspond to the physical signal branches (54,56,59) defined by the time-delay devices 36.

Figure 11:
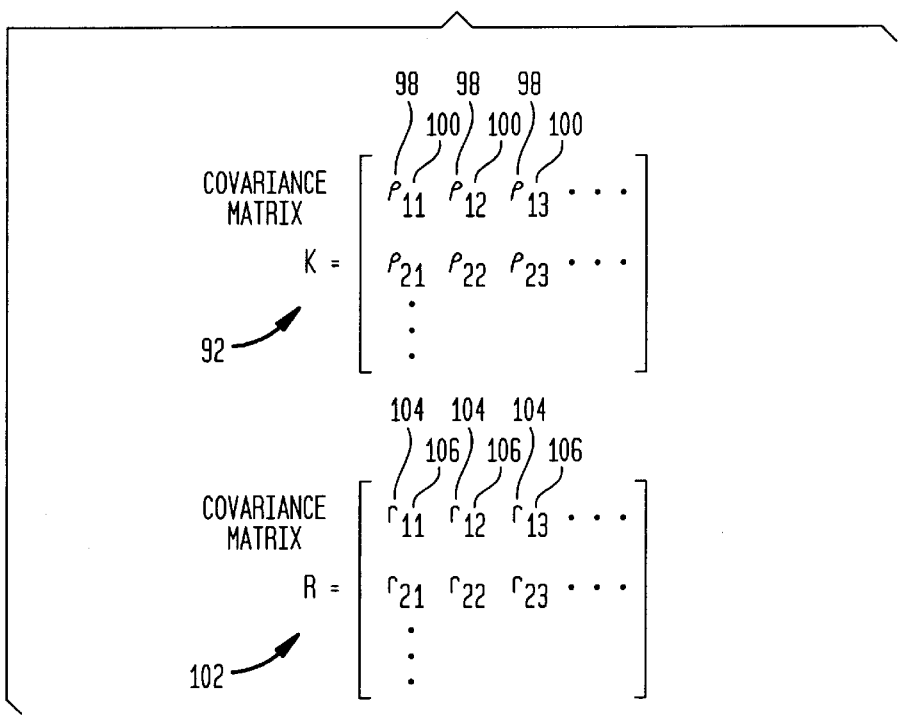
FIG. 11 illustrates a covariance matrix and a relative amplitude matrix for multiple signal branches in accordance with the invention.

FIG. 11 shows a covariance matrix 96 or correlation matrix that is used in situations where greater than two signal branches are being measured by the measuring system 34. Here, the covariance matrix 96 shows at least three signal branches. Each entry 98 preferably represents the correlation of average signal power between any two diversity signal branches. The subscripts 100 indicate signal branch identifiers of a pair of signal branches. For example, $\rho_{12}$ indicates the correlation between the first branch and the second branch over a group of measurement cycles. $\rho_{12}$ may be expressed mathematically as follows: $\rho_{12}=<P_1P_2>/[<P_1><P_2>]$, wherein $P_1$ is the first signal power in the first signal branch 54, $P_2$ is the second signal power in the second signal branch 56, and the brackets, <>, represent an arithmetic time average. More generally, $\rho_{mn}=<P_mP_n>/[<P_m><P_n>]$, wherein $P_m$ is the mth signal power in the mth signal branch and $P_n$ is the nth signal power in the nth signal branch. Accordingly, $\rho_{13}$ indicates the correlation between the first branch and the third branch over the group of measurement cycles. The correlations $\rho_{11}$ and $\rho_{22}$ should each have a correlation value of 1. A correlation of 1 indicates a fully correlated state between a pair of signals associated with a corresponding pair of signal branches, whereas a correlation of 0 indicates an entirely uncorrelated state between a pair of signals. The correlation values are only defined within the range from 0 to 1, inclusive. Although, each correlation entry in the matrix preferably represents a correlation relationship over a group of measurement cycles, a covariance matrix 96 may be created where each correlation value represents as little as one measurement cycle.

FIG. 11 also shows a relative average power ratio matrix 102 that is used in situations where greater than two signal branches are being measured by the measuring system 34. Here, the relative average power matrix 102 shows at least three signal branches. Each entry 104 preferably represents the ratio of average signal power between two signal branches. The subscripts 106 of each relative power ratio identify a pair of signal branches. For example, $r_{12}$ indicates the ratio of average signal power between the first branch and the second branch over a group of measurement cycles. The ratio $r_{12}$ may be expressed mathematically as follows: $r_{12}=<P_1>/<P_2>$, where $P_1$ represents a first signal power of the first branch and $P_2$ represents the second signal power of the second branch. More generally, $r_{mn}=<P_m>/<P_n>$, where $P_m$ represents the mth signal power of the mth signal branch, $P_n$ represents the nth signal power of the nth signal branch, and the brackets, <>, represent a time average. Accordingly, $r_{13}$ indicates a ratio of average signal power between the first branch and the third branch over the group of measurement cycles. The ratios $r_{11}$ and $r_{22}$ should each have a power ratio value of one. If the power ratio is one, the average signal power between the two signal branches is approximately equal. Although each average power ratio preferably represents an average power ratio over a group of measurement cycles, a relative average power matrix may be created where each entry represents as little as one measurement cycle.

This specification describes various illustrative embodiments of the system and method of the present invention. The scope of the claims is intended to cover various modifications and equivalent arrangements of the illustrative embodiments disclosed in the specification. Therefore, the following claims should be accorded the reasonably broadest interpretations to cover the modifications, equivalent structures, and features which are consistent with the spirit and the scope of the invention disclosed herein.

The following is claimed:

1. A system for measuring input signals comprising:

a plurality of time-delay devices for delaying respective input signals to produce time-staggered delayed signals with respect to one another;

a combiner for combining the delayed signals to form a combined signal;

a recorder for recording the combined signal in amplitude versus time such that the combined signal include successive measurement cycles, each successive measurement cycle containing a time window corresponding to each of the delayed signals;

an evaluator for determining average power, within each time window of the combined signal, over a group of the successive measurement cycles for each of the delayed signals.

2. The system according to claim 1 wherein the time-delay devices are adjusted such that each of the offset durations is commensurate with an estimated spreading interval associated with electromagnetic transmission of the input signals to the time-delay devices.

3. The system according to claim 1 wherein the time-delay devices are adjusted such that each of the offset durations equals an estimated spreading interval, associated with electromagnetic transmission of the input signals to the time-delay devices, plus a tolerance interval.

4. The system according to claim 1 wherein the time-delay devices are adjusted such that each of the offset delay durations corresponding to the time-delay devices exceeds a difference between a first arrival time of a direct pulse received at the system and a second arrival time of an indirect pulse being a derivative of the direct pulse and subjected to a propagational delay prior to being received at the system, the direct and indirect pulses iteratively following each other to form a pulse train.

5. The system according to claim 1 further comprising a processing system for determining a correlation between at least one pair of the delayed signals and for determining a relative amplitude between at least one pair of the delayed signals, the processing system including a controller for generating a control signal having states indicating which of the input signals based upon the correlation and the relative amplitude.

6. The system according to claim 5 further comprising:

a diversity antenna providing separate ones of the input signals.

7. The system according to claim 6 further comprising:

a radio frequency switching matrix having radio frequency inputs, a radio frequency output capable of being interconnected with one or more of the radio frequency inputs, and a control terminal for communication with the controller;

a splitter for receiving separate ones of the input signals from the antennas and for splitting the input signals between the radio frequency inputs and the time-delay devices.

8. The system according to claim 5 further comprising:

a dual-polarization antenna for providing a first polarization signal and a second polarization signal as the input signals.

9. The system according to claim 8 further comprising:

a radio frequency switching matrix having radio frequency inputs, a radio frequency output capable of being interconnected with one or more of the radio frequency inputs, and a control terminal for communication with the controller;

a splitter for receiving the first polarization signal and the second polarization signal and for splitting the first polarization signal and the second polarization signal between the radio frequency inputs and the time-delay devices.

10. The system according to claim 5 further comprising:

angular-diversity antenna system for providing a first angular signal and a second angular signal as the input signals.

11. The system according to claim 10 further comprising:

a radio frequency switching matrix having radio frequency inputs, a radio frequency output capable of being interconnected with one or more of the radio frequency inputs, and a control terminal for communication with the controller;

a splitter for receiving the first angular signal and the second angular signal and for splitting the first angular signal and the second angular signal between the radio frequency inputs and the time-delay devices.

12. The system according to claim 1 further comprising a processing system for determining a correlation matrix containing respective correlations between corresponding pairs of the delayed signals and for determining a relative amplitude matrix containing amplitude ratios between corresponding pairs of the delayed signals, the processing system including a controller for generating a control signal having states indicating which of the input signals to synchronously combine based upon the correlation matrix and the relative amplitude matrix.

13. The system according to claim 1 further comprising a correlator for determining the correlation between the average power, within each time window, of a pair of the delayed signals over the group of the measurement cycles.

14. The system according to claim 1 further comprising an amplitude comparing device for determining a relative amplitude ratio between the average power of a pair of the delayed signals over the group of the measurement cycles.

15. The system according to claim 1 further comprising:

a correlator for determining a correlation between the average power, over a time window, of a pair of the delayed signals over the group of the measurement cycles;

an amplitude comparing device for determining a relative amplitude ratio between the average power of a pair of the delayed signals over the group of the measurement cycles;

a controller for generating a control signal to combine input signals corresponding to the pair of the delayed signals if the relative amplitude ratio is equal to one or differs from one by no greater than a maximum tolerance.

16. The system according to claim 1 further comprising:

a correlator for determining a correlation between the average power, over a time window, of a pair of the delayed signals over the group of the measurement cycles;

an amplitude comparing device for determining a relative amplitude ratio between the average power of a pair of the delayed signals over the group of the measurement cycles;

a controller for generating a control signal to combine input signals corresponding to the pair of the delayed signals if the correlation approaches zero within a predetermined tolerance and if the relative amplitude ratio is equal to one or differs from one by no greater than a maximum tolerance.

17. A system according to claim 1 wherein the recorder comprises a single receiver for demodulating and recording the input signals derived from a common received signal.

18. A method for enhancing signal reception comprising:

delaying different input signals to produce time-staggered delayed signals with respect to one another;

combining the delayed signals to form a combined signal;

recording the combined signal in amplitude versus time such that the combined signal includes successive measurement cycles, each successive measurement cycle containing a time window corresponding to each of the delayed signals; and determining average powers, within each time window of the combined signal, for a group of successive measurement cycles for each of the delayed signals.

19. The method according to claim 18 wherein the delaying step comprises adjusting each of the offset delay durations to be commensurate with an estimated spreading interval of an electromagnetically transmitted signal as a source of the input signals.

20. The method according to claim 18 wherein the delaying step comprises adjusting each of the offset durations to be equal to an estimated spreading interval of an electromagnetically transmitted signal, as a source of the input signals, plus a tolerance interval.

21. The method according to claim 18 wherein the delaying step comprises adjusting each of the offset delay durations to exceed a difference between a first arrival time of a direct pulse received as one of the input signals and a second arrival time of an indirect pulse being a derivative of the direct pulse and subjected to a propagational delay, the direct and indirect pulses iteratively following each other to form a pulse train.

22. The method according to claim 18 further comprising the step of:

providing a control signal indicating whether or not any two of the input signals should be synchronously combined to enhance signal reception characteristics based upon the determined average powers.

23. The method according to claim 18 further comprising:

determining a correlation between at least one pair of the delayed signals and for determining a relative amplitude between at least one pair of the delayed signals, and generating a control signal having states indicating whether or not to synchronously combine the input signals based upon the correlation and the relative amplitude.

24. The method according to claim 18 further comprising:

determining a correlation matrix containing respective correlations between corresponding pairs of the delayed signals and for determining a relative amplitude matrix containing amplitude ratios between corresponding pairs of the delayed signals; and generating a control signal having states indicating which of the input signals to synchronously combine based upon the correlation matrix and the relative amplitude matrix.

25. The method according to claim 18 further comprising the step of:

determining the correlation between the average power, over a time window, of a pair of the delayed signals over the group of the measurement cycles.

26. The method according to claim 18 further comprising the step of:

determining a relative amplitude ratio between the average power of a pair of the delayed signals over the group of the measurement cycles.

27. The method according to claim 18 further comprising the step of:

determining the correlation between the average power, over a time window, of a pair of the delayed signals over the group of the measurement cycles;

determining a relative amplitude ratio between the average power of a pair of the delayed signals over the group of the measurement cycles;

generating a control signal to combine input signals corresponding to the pair of delayed signals if the relative amplitude ratio is equal to one or differs from one by a maximum tolerance.

28. The method according to claim 18 further comprising:

determining the correlation between the average power of a pair of the delayed signals over the group of the measurement cycles;

determining a relative amplitude ratio between the average power of a pair of the delayed signals over the group of the measurement cycles;

generating a control signal to combine input signals corresponding to the pair of delayed signals if the correlation approaches zero within a predetermined tolerance and if the relative amplitude ratio is equal to one or differs from one by no greater than a maximum tolerance.

29. The method according to claim 18 further comprising:

providing separate ones of the input signals from spatially separated antennas of a diversity antenna; and interconnecting one or more radio frequency inputs with a radio frequency output in response to a control signal determined based upon the determined average powers.

30. The method according to claim 18 further comprising:

providing input signals including a first polarization signal and a second polarization signal of a dual-polarization antenna; and interconnecting one or more radio frequency inputs with a radio frequency output in response to a control signal determined based upon the determined average powers.

31. A method for enhancing signal reception comprising:

delaying a second input signal by a delay duration to produce a delayed signal with respect to a first input signal;

combining the delayed signal and the first input signal to form a combined signal;

determining a first average power of successive samples of the first input signal and determining a second average power of successive samples of the delayed signal from the combined signal;

providing a control signal indicating whether or not the first input signal and the second input signal should be synchronously combined to enhance signal reception characteristics based upon the first average power and the second average power.

32. The method according to claim 31 further comprising:

comparing the first average power and the second average power to determine if the first average power and the second average power are equal or differ within a predetermined limit.

33. The method according to claim 31 further comprising:

determining a correlation between successive samples of the first input signal and successive samples of the second input signal from the combined signal.

34. The method according to claim 33 further comprising:

comparing the first average power and the second average power to determine if the first average power and the second average power are equal or differ within a predetermined limit; and determining a state of the control signal based upon the comparison and the correlation.

35. The method according to claim 33 further comprising the step of:

combining the first signal and the second signal to form a received signal in response to the control signal indicating the first average power and the second average power are equal or within the predetermined limit and the control signal indicating the correlation is generally uncorrelated.

36. The method according to claim 33 further comprising the step of:

combining the first signal and the second signal to form a received signal in response to the control signal indicating that a function of the first average power, the second average power, and the correlation has been satisfied.

37. The method according to claim 31 further comprising the step of:

combining the first signal and the second signal to form a received signal in response to the control signal indicating that the first average power and the second average power are equal or within the predetermined limit.

38. The method according to claim 31 further comprising:

inducing the first input signal and the second input signal in antennas; and separating the antennas to form a space-diversity antenna system with the first input and the second input being associated with different ones of the antennas.

39. The method according to claim 31 further comprising:

inducing the first input signal and the second input signal in antennas; and arranging the antennas to form a dual-polarity antenna with the first input and the second input being associated with a first polarity and a second polarity, respectively.

* * * * *